United States Patent [19]

Nishikawa

[11] Patent Number: 5,528,576

[45] Date of Patent: Jun. 18, 1996

[54] OPTICAL HEAD INCLUDING A HALFWAVE PLATE AND A MONAXIAL CRYSTAL FOR SPLITTING A LIGHT BEAM INTO TWO ORTHOGONAL, POLARIZED LIGHT BEAMS

[75] Inventor: Kohichiro Nishikawa, Inagi, Japan

[73] Assignee: Canon Kabushiki Kaisha, Tokyo, Japan

[21] Appl. No.: 429,018

[22] Filed: Apr. 26, 1995

Related U.S. Application Data

[63] Continuation of Ser. No. 250,957, May 27, 1994, abandoned, which is a continuation of Ser. No. 857,635, Mar. 25, 1992, abandoned.

[30] Foreign Application Priority Data

Mar. 28, 1991 [JP] Japan ................................. 3-087256

[51] Int. Cl.$^6$ ........................................ G11B 7/12
[52] U.S. Cl. ........................ 369/112; 369/110; 369/116; 369/44.23
[58] Field of Search ................................. 369/112, 114, 369/116, 110, 44.41, 44.14, 13, 44.23, 109, 44.24; 250/201.5; 360/114; 347/260, 244

[56] References Cited

U.S. PATENT DOCUMENTS

| | | | |
|---|---|---|---|
| 4,682,311 | 7/1987 | Matsubayashi et al. | 369/112 |
| 4,721,368 | 1/1988 | Deguchi et al. | 369/110 |
| 4,803,579 | 2/1989 | Koyama | 360/114 |
| 4,813,032 | 3/1989 | Koyama | 369/13 |
| 4,823,334 | 4/1989 | Tanaka et al. | 369/112 |
| 4,953,124 | 8/1990 | Koyama | 360/114 |
| 4,954,702 | 9/1990 | Kurogama et al. | 369/44.14 |
| 5,016,237 | 5/1991 | Nakamura et al. | 369/112 |
| 5,029,261 | 7/1991 | Koyama et al. | 250/201.5 |
| 5,045,868 | 9/1991 | Tajima | 347/260 |
| 5,065,390 | 11/1991 | Miyauchi et al. | 369/44.14 |
| 5,073,879 | 12/1991 | Ando et al. | 369/13 |
| 5,134,426 | 7/1992 | Kataoka et al. | 347/244 |
| 5,293,569 | 3/1994 | Koyama | 369/112 |

FOREIGN PATENT DOCUMENTS

| | | |
|---|---|---|
| 51-107121 | 9/1976 | Japan . |
| 64-82348 | 3/1989 | Japan . |

OTHER PUBLICATIONS

Patent Abstracts of Japan, Kokai No. 63-149842, vol. 12, No. 413, Nov. 1988.
Patent Abstracts of Japan, Kokai No. 01-082348, vol. 13, No. 314, Jul. 1989.
Patent Abstracts of Japan, Kokai No. 01-138632, vol. 13, No. 391, Aug. 1989.

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An optical head for use in a magnetooptical record/reproducing apparatus includes a light source emitting a linearly polarized light beam guided to a polarized direction rotating element to rotate the polarized direction of the light beam. The light beam emerging from the polarized direction rotating element is split into two light beams by a light beam splitting device which has a monoaxial crystal and which is adapted to split the incident light beam into two light beams with mutually perpendicular polarized directions. The light beam is converged onto a medium and the light beam returned from the medium is detected. The polarized direction of the light beam emitted from the light source coincides with the direction of the crystal axis of the monoaxial crystal. The polarized direction of the light beam emitted from the light source is so positioned as not to form an angle with respect to the longitudinal direction or perpendicular direction of information tracks of the medium.

26 Claims, 6 Drawing Sheets

SECTIONAL INTENSITY DISTRIBUTION OF LIGHT BEAM 50

OPTICAL HEAD INCLUDING A HALFWAVE PLATE AND A MONAXIAL CRYSTAL FOR SPLITTING A LIGHT BEAM INTO TWO ORTHOGONAL, POLARIZED LIGHT BEAMS

This application is a continuation of prior application, Ser. No. 08/250,957 filed May 27, 1994, which application is a continuation of prior application, Ser. No. 07/857,635 filed Mar. 25, 1992, both now abandoned.

BACKGROUND OF THE INVENTION

1. Field of the Invention

The present invention relates to the optical structure of an optical head for use in a magnetooptical information record/reproducing apparatus.

2. Related Background

For use in a magnetooptical record/reproducing apparatus capable of verifying a recorded signal simultaneously with overwriting by magnetic field modulation, U.S. Pat. No. 5,293,569 issued Mar. 8, 1994, discloses an optical system of the optical head as shown in FIG. 1. In this drawing, S-direction is defined as the vertical direction parallel to a junction plane 4d of a crystal-coupled prism 4, consisting of rectangular monoaxial crystal prism 4a, 4b and a rectangular glass prism 4c, and the P-direction is defined as a direction perpendicular to the S-direction and also to the light beam advancing direction.

A semiconductor laser 1 is so positioned to emit linearly polarized light with a polarizing direction inclined by an angle α with respect to the P-direction. The diverging light beam from the semiconductor laser 1 is converted by a collimating lens 2 into a parallel light beam 50 which enters the rectangular prism 4a from an end face thereof. The rectangular prism 4a, consisting of the monoaxial crystal, has its optical (crystal) axis in the P-direction (with respect to the light beam 50). Consequently, before and after the reflection on the junction plane 4d, the p-component of the parallel light beam 50 is subjected to the extraordinary refractive index $n_e$ and the ordinary refractive index $n_o$ while the s-component of said beam is subjected only to the ordinary refractive index $n_o$ as shown in FIG. 2, whereby the light beam 50 is split into two linearly polarized light beams 100a, 100b (hereinafter collectively represented as 100) which have mutually perpendicular polarized directions and have a mutual angle therebetween in the horizontal plane. The light quantity ratio $\tan^2\alpha$ of the p- and s-components is determined by the angle α of the polarized direction of the semiconductor laser 1. The ratio becomes 7:1 when α=20.7°. The light beams 100 are guided by a deflecting mirror 5 and an objective lens 6 and form small spots SP1, SP2 on a same track 8 of a magnetooptical disk 7 constituting the optical information recording medium. When the disk 7 is rotated in a direction from SP2 to SP1 (indicated by an arrow), the angle α is so selected that, during the overwriting operation, the spot SP2 is exposed to a writing operation and the spot SP1 is exposed to a reading operation. In the overwriting operation, a magnetic field variable magnet 9 modulates the magnetic field according to the recording signal, thereby effecting recording at the position of the spot SP2, and the recorded signal is simultaneously read at the position of the succeeding spot SP1 to obtain a verifying signal. During the simple reproducing operation, the output power of the semiconductor laser is so regulated that the spot SP2 is exposed to a reading operation while the spot SP1 is exposed to a practically negligible low power, and the ordinary reproducing operation is conducted at the leading spot SP2. Such operations will not be explained as they are already described in detail in the aforementioned U.S. Patent Application.

The crystal-coupled prism 4 is provided with an evaporated half mirror ($r_p^2$=0.5, $r_s^2$=0.5) on the junction plane 4d between the prisms 4a, 4b.

The light 150 reflected by the magnetooptical disk 7 is guided to the crystal-coupled prism 4 through a light path substantially inverse to that toward the disk. The prism 4b of monoaxial crystal has its optical axis inclined by 45° to the P- and S-directions. Consequently, the light beams entering the prism 4b through the junction plane 4d are subjected to the ordinary refractive index $n_o$ and the extraordinary refractive index $n_e$, respectively at angles of 45°, whereby the light beam 150a is split into beams 200a, 200b while the light beam 150b is split into beams 200c, 200d. These emerging light beams 200a, 200b, 200c, 200d enter, through an imaging lens 10, respectively, four photosensor elements 11a, 11b, 11c, 11d of a photosensor 11. A servo signal and an RF signal can be obtained from the outputs of the photosensor elements 11a through 11d. For example, in case of overwriting, an RF signal for verifying can be obtained by (output of 11a–output of 11b), and, in the case of a simple reproduction operation, a magnetooptical signal as an RF reproduction signal can be obtained by (output of 11c–output of 11d).

However, in the incident optical system (forward path), the angle between the light beams 100a, 100b becomes as large as about 0.5° when the rectangular prism 4a, 4b is made for example of rock crystals, and such light beams may form unsatisfactory spots if directly guided to the objective lens 6. For this reason it is conceived, as shown in FIG. 3, to insert a beam cross section shaping prism 12 along the direction of arrangement of the beams 100a, 100b. If the prism has a shaping ratio M on the beam cross section, the angle between the light beams proceeding toward the objective lens 6 becomes 1/M, whereby satisfactory image quality can be assured.

In such conventional configuration, if the junction plane 4d of the crystal-coupled prism 4 does not have a polarizing property, an intensity ratio of 7:1 between the spots SP2 and SP1 corresponds to $\tan^2\alpha$=1/7 or α=20.7°. In the absence of the shaping prism, the two spots SP1, SP2 are made oval in shape because the far field of the light beam emitted from the semiconductor laser 1 is not rotationally symmetrical. Consequently, if such spots are positioned on a same track of the magnetooptical disk 7, the longer axis of the oval shape will have an angle of 20.7° with respect to the longitudinal or perpendicular direction of the track, and such situation is undersirable for high-density information recording in the longitudinal direction of the track. This drawback still remains even when the shaping of beam cross section is applied, unless completely circular spots are obtained by complete shaping. Also, the narrower field direction of the light beam from the semiconductor laser 1 has an angle of 20.7° with respect to the beam expanding direction in the cross section shaping. This fact, that the direction narrower in the far field of the light beam emitted from the semiconductor laser does not coincide with the expanding direction in beam cross section shaping, leads to another drawback of inefficient utilization of the light beam from the semiconductor laser 1.

SUMMARY OF THE INVENTION

In consideration of the foregoing, an object of the present invention is to provide, in a magnetooptical record/reproducing optical head utilizing monoaxial crystal for generating two light beams, the longer axis direction of the light spots on the magnetooptical recording medium is set in a desired direction, thereby enabling high-density information recording. It is also an object of the present invention to provide an optical head capable of efficiently utilizing the light beam of a non-circular cross section from a light source.

The above-mentioned objects can be attained, according to the present invention, by a magnetooptical record/reproducing head comprising a light source generating a linearly polarized light beam, a polarized direction rotating element for rotating the polarized direction of the polarized light beam emitted from the light source, a light beam splitting element for splitting the polarized light beam emerging from the polarized direction rotating element into two light beams, and converging means for converging the two light beams emerging from the light beam splitting element onto a magnetooptical recording medium, wherein the light beam splitting element includes a monoaxial crystal and is adapted to split the incident light beam into two linearly polarized light beams with mutually perpendicular polarizing directions and with a light quantity ratio depending on the polarized direction of the incident light beam.

More specifically according to the present invention, the linearly polarized light beams are so positioned that the polarized directions thereof do not form an angle with respect to the longitudinal or perpendicular direction of the information track of the magnetooptical disk.

Furthermore, according to the present invention, there may be provided shaping means for light beam cross section between the light beam splitting means and the converging means, as will be illustrated in the following embodiment, thereby enabling the polarized direction of the light beam emitted from the light source, the arranged direction of two beams emerging from the light beam splitting element, and the shaping direction by the cross section shaping means to coincide one another.

Furthermore, according to the present invention, the light source may be composed of a semiconductor laser and the polarizing direction rotating element may be composed of a ½-wavelength plate as shown in the following embodiment.

DESCRIPTION OF THE PREFERRED EMBODIMENTS

Now the present invention will be clarified in detail by embodiments thereof shown in the attached drawings. The following description will concentrate on the incident optical system only.

Figure 4:
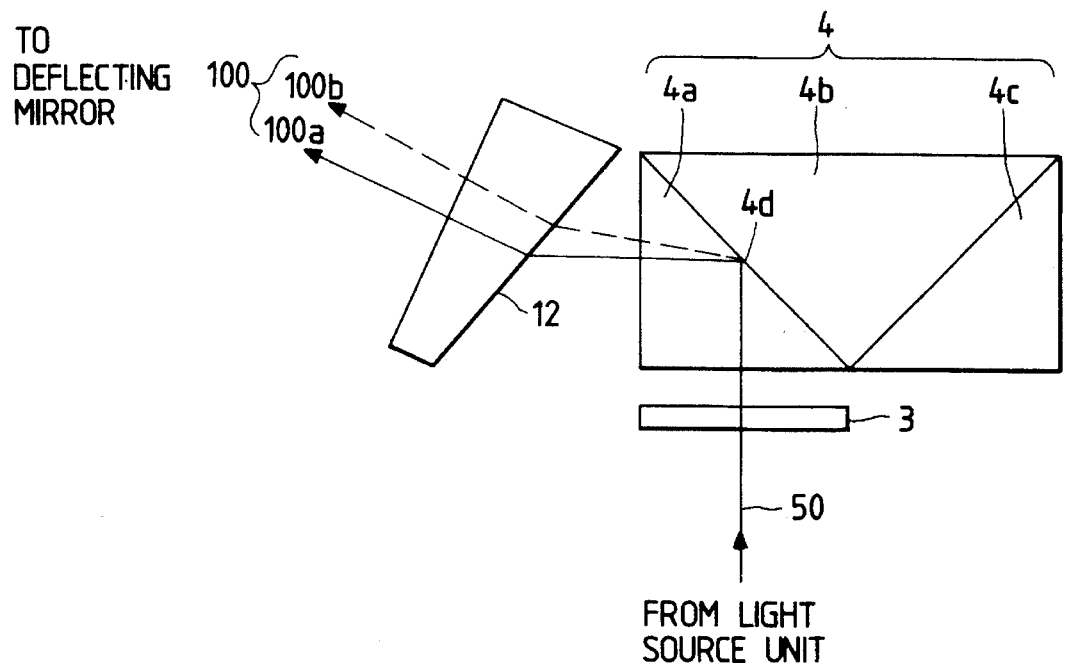
FIG. 4 is a schematic view showing a part of optical system of a magnetooptical record/reproducing optical head of the present invention.
Figure 5:
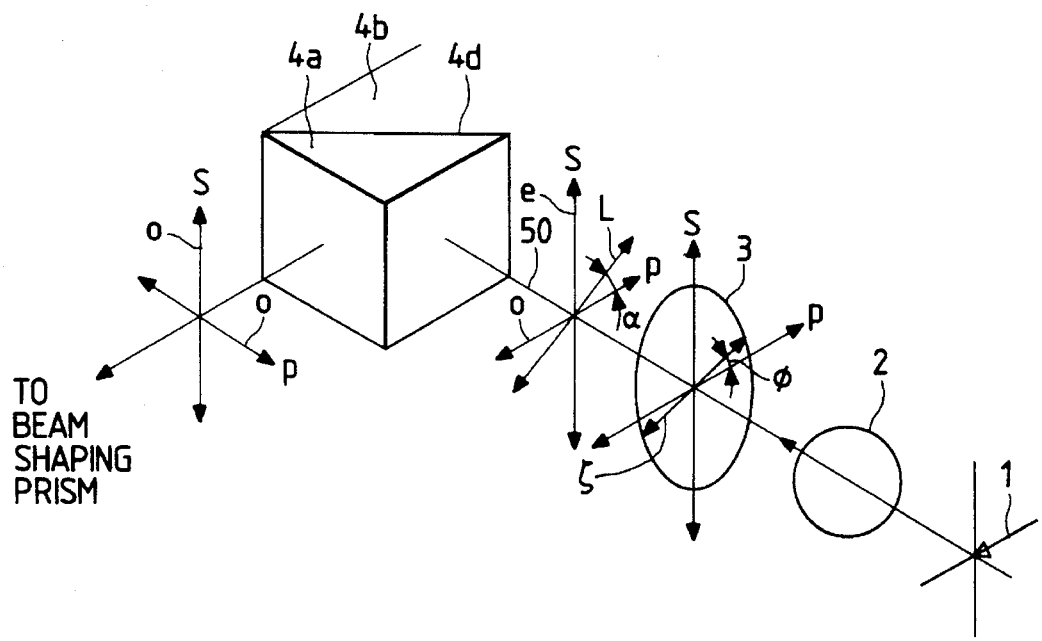
FIG. 5 is a schematic view showing the polarized state of the light beam passing through a part of the optical system shown in FIG. 4.
Figure 6A:
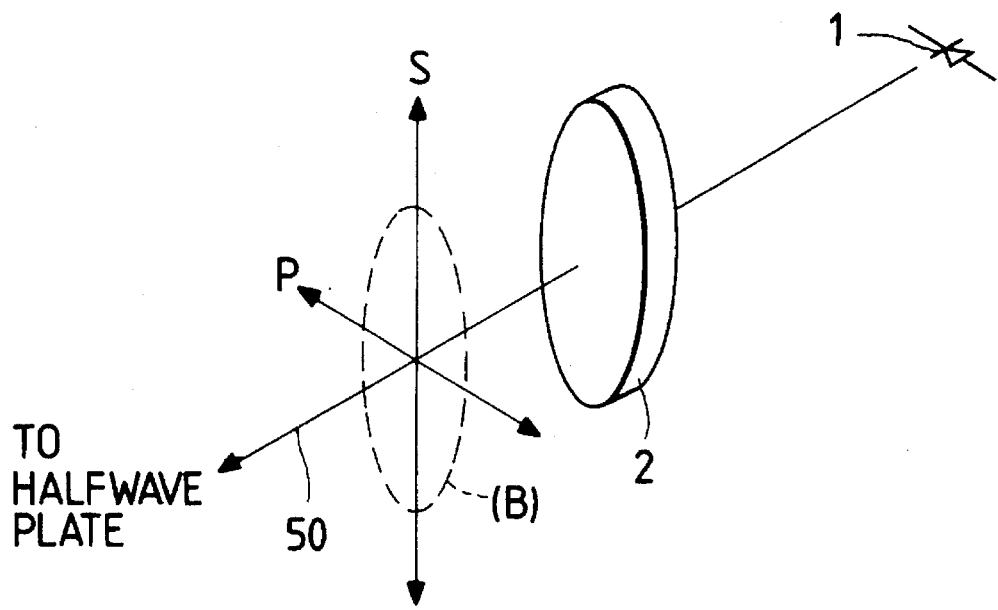
FIGS. 6A and 6B are schematic views of a light source of the optical system shown in FIG. 4.
Figure 6B:
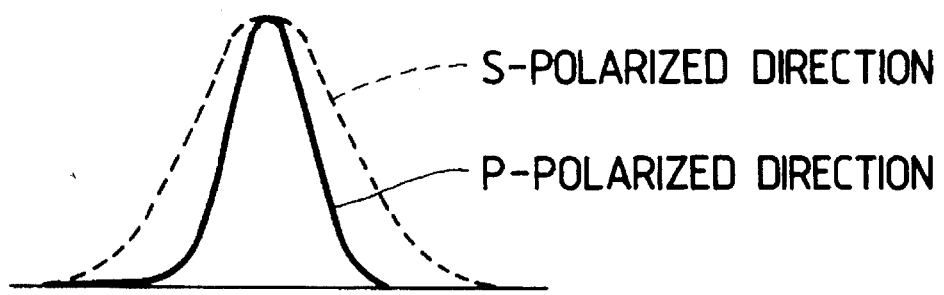

FIG. 4 is a schematic view showing a part of optical configuration (a part of optical system for incident path) of a magnetooptical record/reproducing optical head constituting an embodiment of the present invention. FIG. 5 is a view showing the polarized state of the light beam passing through a part of the optical system. FIG. 6 shows the structure and light intensity distribution of the light source, respectively in FIGS. 6A and 6B. The entire structure of the optical head will not be explained as it is essentially the same as that already explained in relation to FIG. 1, and the following description will concentrate on improved parts thereof.

In the present embodiment, a light beam emitted from a semiconductor laser 1 is converted by a collimating lens 2 into a parallel beam 50. As shown in FIG. 5, the light beam emitted from the semiconductor laser 1 is polarized in the P-direction. Thus the semiconductor laser 1 is so positioned as to emit linearly polarized light having a polarized direction not inclined with respect to the P-direction. The cross-sectional intensity distribution of the parallel light beam 50 has an oval shape, as shown in FIGS. 6A and 6B, with the longer and shorter axes respectively in the S- and P-directions. Upon passing through a halfwave plate 3, the light beam 50 is subjected to a rotation of the polarizing plane by an angle $\alpha$, thus being converted into a light beam polarized in a direction L. The halfwave plate 3 is so positioned that the optical axis $\zeta$ forms an angle $\phi$ to the P-direction, wherein $\alpha=2\phi$. A rectangular prism 4a of a monoaxial crystal has the optical (crystal) axis positioned in the P-direction (with respect to the light beam 50).

Figure 1:
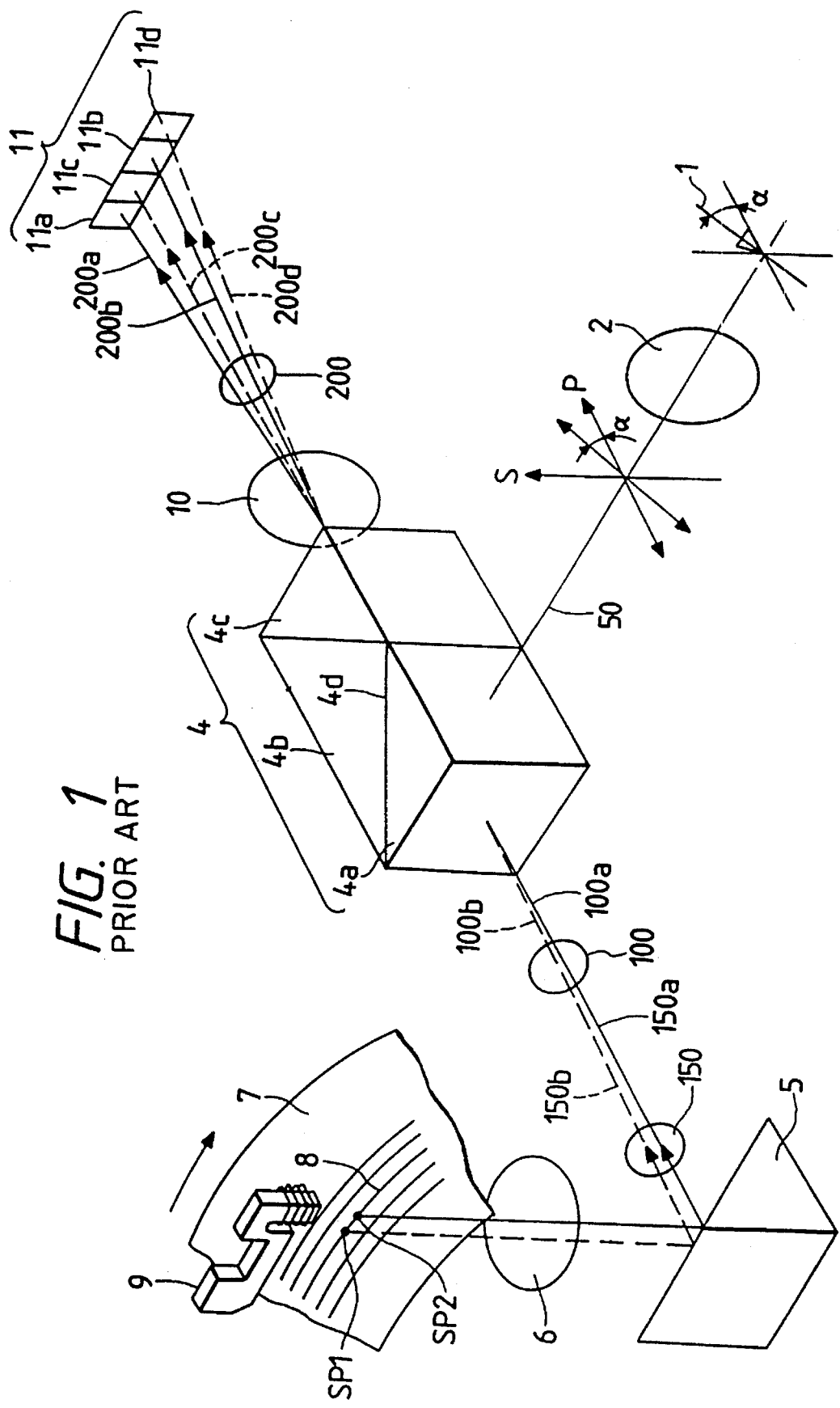
FIG. 1 is a perspective view showing the structure of optical system of a conventional optical head for the magnetooptical record/reproducing apparatus.
Figure 2:
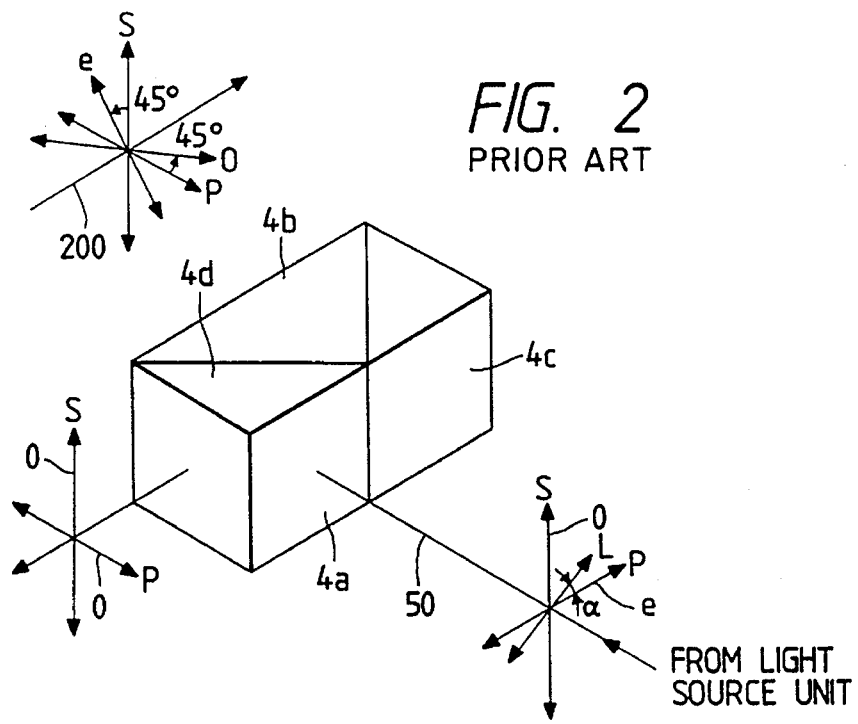
FIG. 2 is a schematic view showing the polarized state of the light beam passing through a part of the optical system shown in FIG. 1.
Figure 3:
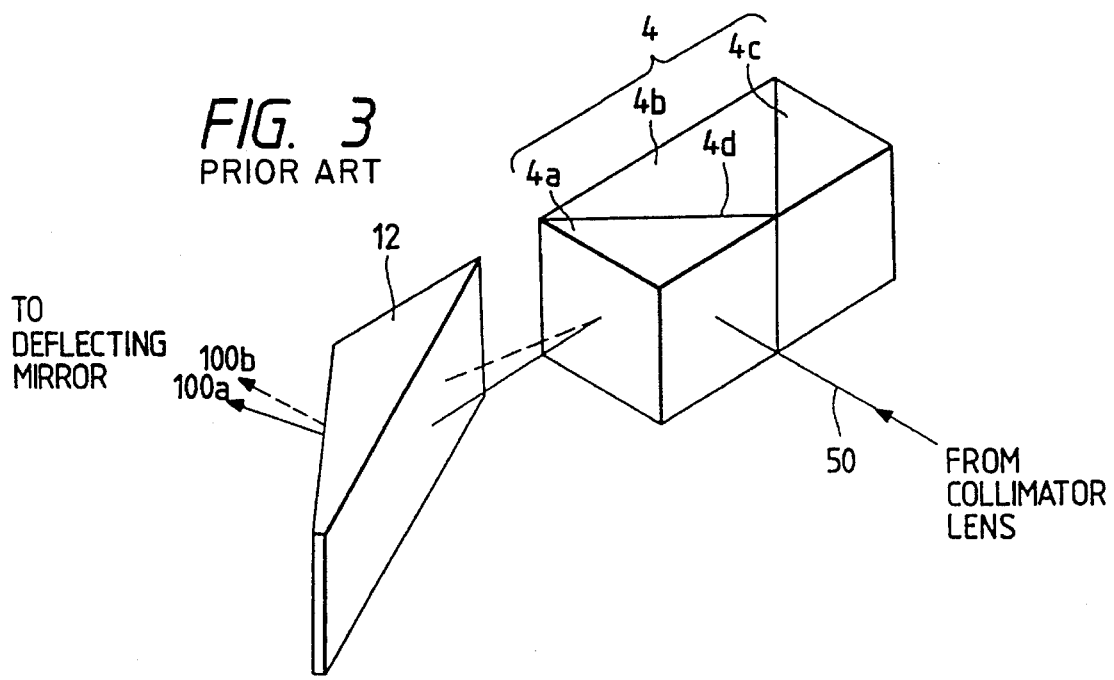
FIG. 3 is a schematic view showing a part of optical system of an optical head, employing a prism for shaping the light beam cross section.

As in the apparatus already shown in FIG. 1, the parallel light beam 50 emerging from the halfwave plate 3 is reflected by a junction plane 4d of prisms 4a, 4b, and the p-component thereof is subjected to the extraordinary refractive index $n_e$ and the ordinary refractive index $n_o$ subsequently while the s-component is subjected to the ordinary refractive index $n_o$ only, whereby the light beam 50 is split into two linearly polarized light beams 100a, 100b (hereinafter collectively represented as beams 100) of a light quantity ratio depending on the polarized direction of the beam 50, the two beams having mutually perpendicular polarized directions and also having a mutual angle therebetween in the horizontal direction. The two light beams pass through a prism 12 for shaping the cross section of the light beams. The intensity ratio of the two beams 100a, 100b is represented by $\eta \cdot \tan^2\alpha = \eta \cdot \tan^2(2\phi)$ wherein $\eta$ is the intensity reflectance ratio of the p- and s-components on the prism junction plane 4d, and is therefore determined by the angle $\phi$ of the halfwave plate 3. The above-mentioned light beam cross section shaping prism 12 is so positioned that its widening direction is parallel to the arranged direction of the beams 100a and 100b, corresponding to the P-direction in FIG. 6A. Therefore, the direction of polarization of the light beam from the semiconductor laser 1, the arranged direction of the light beams emerging from the prism 4a, and the shaping direction by the prism 12 mutually coincide and lie on the same plane. Besides, as already explained above, the direction of narrower distribution of cross-sectional intensity of the light beam 50 from the semiconductor laser 1 is in the P-direction. Therefore the shaping prism 12 expands the cross section of the light beam in the p-direction and compresses the angle between the two beams 100a and 100b, thereby ensuring satisfactory focusing performance.

As explained above, the magnetooptical record/reproducing optical head of the present invention comprises a light source unit generating a linearly polarized light beam, a polarized direction rotating element for rotating the polarized direction of the light beam emitted by the light source unit, a light splitting element for splitting the light beam emerging from the rotating element, converging means for converging the light beams emerging from the splitting element onto a magnetooptical recording medium, optical means for condensing light beams coming from the recording medium, and detection means for detecting the light beams condensed by the optical means, wherein the light beam splitting element includes a monoaxial crystal and is adapted to split the incident light beam into two light beams of mutually perpendicular polarized directions.

Also according to the present invention, the light source unit can be composed of a semiconductor laser as shown in the embodiment.

Also according to the present invention, the polarized direction rotating element can be composed of a halfwave plate as shown in the embodiment.

Also according to the present invention, the polarized direction of the light beam emitted from the light source unit coincides with the direction of the crystal axis of the monoaxial crystal, as shown in the embodiment.

Furthermore, according to the present invention, the polarized direction of the light beam emitted from the light source unit is so positioned as not to form an angle with respect to the longitudinal direction of the information track of the information recording medium, or to the direction perpendicular to the extending direction of the information track, as shown in the embodiment.

Furthermore, according to the present invention, between the light beam splitting element and the converging means there is provided light beam cross section shaping means, whose shaping direction corresponds to the polarized direction of the light beam emitted from the light source unit and the arranged direction of two light beams emerging from the light beam splitting element.

As explained in the foregoing, the present embodiment allows the positioning of the longer axis of two light spots, emitted from the semiconductor laser and formed on the magnetooptical disk, perpendicularly to the longitudinal direction of the recording track of the disk, thereby enabling high-density information recording in the longitudinal direction. In addition, the narrower direction of the far field of the light beam emitted from the semiconductor laser 1 is made to coincide with the expanding direction in shaping of the cross section of the light beam, whereby the light from the semiconductor laser 1 can be efficiently utilized, while focusing performance is improved.

The narrower direction of the far field of the light beam emitted from the semiconductor laser is defined as the narrower direction of the divergent angle of the light beam emitted from the semiconductor laser.

Figure 7:
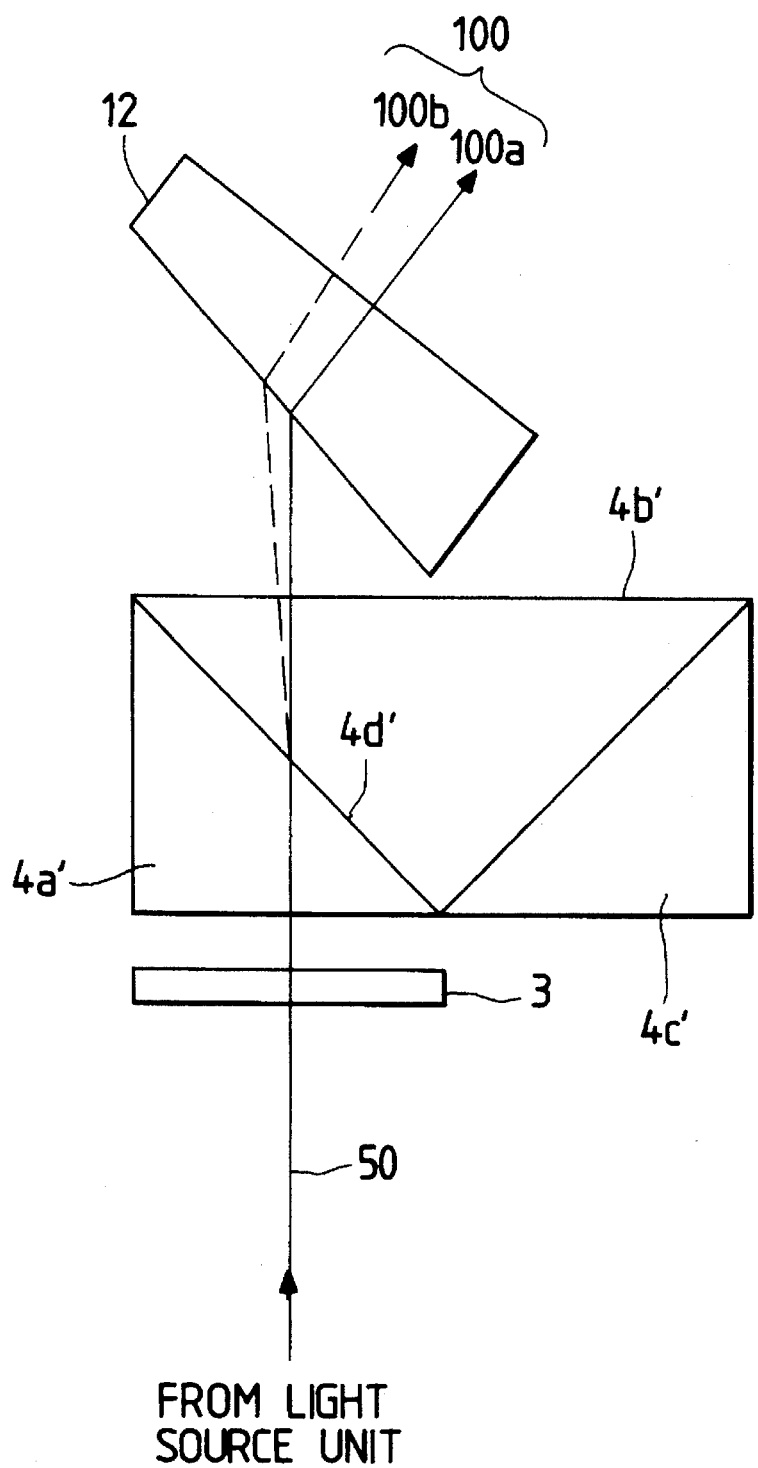
FIG. 7 is a schematic view showing a part of optical system of a magnetooptical record/reproducing optical head of the present invention.

FIG. 7 shows a part of the optical configuration (a part of the optical system for the incident path) of a magnetooptical record/reproducing optical head, constituting another embodiment of the present invention, wherein components the same as or equivalent to those in FIGS. 4 to 6 are represented by the same numbers. The entire structure of the optical head will not be explained as it is essentially the same as that already explained in relation to FIG. 1, and the following description will concentrate on the improved parts thereof.

In this embodiment, the crystal-coupled prism is utilized in a transmissive manner in the incident optical system. In a rectangular prism 4a' of a monoaxial crystal, the s-component is subjected to the ordinary refractive index $n_o$ while the p-component is subjected to the extraordinary refractive index $n_e$, and, after passing through a junction plane 4d' with a glass prism 4b', both components are subjected to the refractive index $n_g$ of glass. Consequently the p- and s-components are refracted with different refraction angles at the junction plane 4d', thus emerging from the prism 4b' as two linearly polarized light beams 100a and 100b. Then these two light beams pass through a prism 12 for shaping the cross section of the light beams. This embodiment also provides similar advantages to those in the foregoing embodiment.

As explained in the foregoing, the magnetooptical record/reproducing optical head of the present invention has a polarized direction rotating element disposed in front of a light beam splitting element which includes a monoaxial crystal and splits the incident light beam into two linearly polarized light beams of mutually perpendicular polarized directions and of a light quantity ratio depending on the polarized direction of the incident light beam, thereby directing the longer axis of two light spots formed on a magnetooptical recording medium in the longitudinal direction of a recording track of the recording medium or in a direction perpendicular to the longitudinal direction of the recording track, thus enabling high-density information recording.

In addition, according to the present invention, means for shaping the cross section of the light beam is positioned behind the light beam splitting element for matching the narrower direction of the far field of the light beam emitted from the light source with the expanding direction in shaping of the cross section of the light beam, whereby the light from the light source can be efficiently utilized, while focusing performance is improved.

The present invention has been described by embodiments thereof applied to a magnetooptical record/reproducing optical head, but the present invention is likewise applicable to an optical head for use in combination with an optical disk, which is an optical recording medium exclusive for reproducing, such as compact disk.

Figure 8:
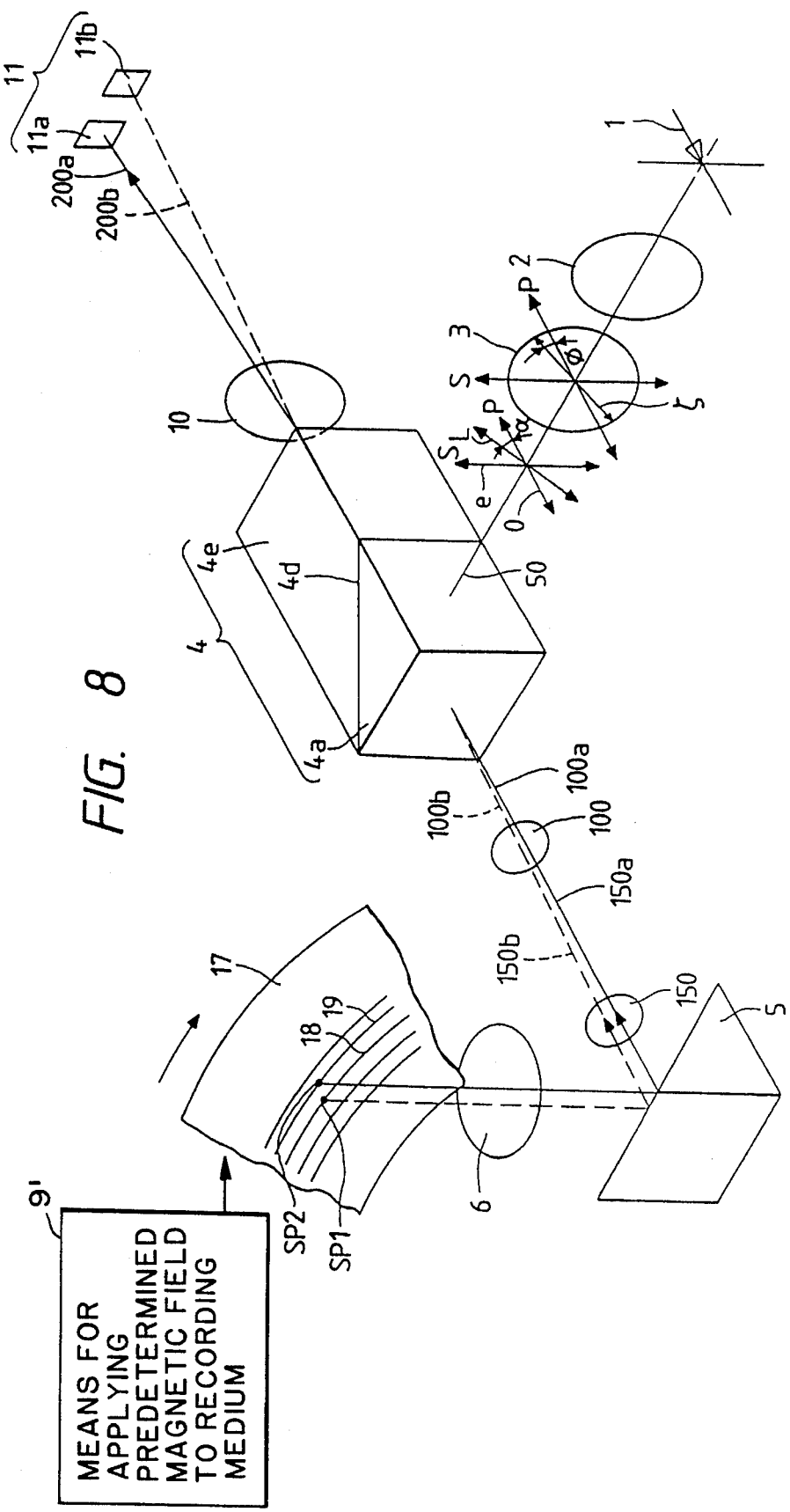
FIG. 8 is a perspective view showing the structure of optical system of an optical record/reproducing head of the present invention.

FIG. 8 shows optical configuration of an optical record/reproducing head constituting an embodiment of the present invention. The entire structure of the optical head will not be explained as it is similar to that shown in FIG. 1, and the following description will concentrate on the improved parts thereof.

A light beam emitted from a semiconductor laser 1 is converted by a collimating lens 2 into a parallel beam 50, which is subjected to a rotation of the polarizing plane thereof by an angle α, upon passing through a halfwave plate 3.

The semiconductor laser 1, collimating lens 2 and halfwave plate 3 mentioned above are constructed in the same manner as in the embodiment shown in FIG. 5.

The parallel light beam 50 emerging from the halfwave plate is split, as already explained in relation to FIG. 5, into two light beams 100a, 100b, at the reflection on a junction face 4d between a monoaxial crystal prism 4a and a glass prism 4e. The two beams are respectively focused as small spots SP1, SP2 on different tracks 18, 19 of a compact disk 17 on which a magnetic field is applied by means for applying a predetermined magnetic field 9'.

The light beams 150 reflected from the compact disk 17 pass through the crystal-coupled prism 4 and reach two photosensor units 11a, 11b, of which outputs are utilized for obtaining the reproduction signals from the two tracks.

As explained in the foregoing, the optical record/reproducing head of the present embodiment shown in FIG. 8 comprises a light source unit generating a linearly polarized light, a polarized direction rotating element for rotating the polarized direction of the light beam emitted by the light source unit, a light beam splitting element for splitting the light beam emerging from the rotating element, converging means for converging the light beams emerging from the splitting element onto a recording medium, optical means for condensing the light beams coming from the recording medium, and detection means for detecting the light beams condensed by the optical means, wherein the light beam splitting element includes a monoaxial crystal and is adapted to split the incident light beam into two light beams with mutually perpendicular polarized directions.

Such a structure allows the directing of the longer axis of two light spots formed on the optical recording medium along the longitudinal direction of the tracks of the recording medium or the perpendicular direction of the tracks, thereby enabling satisfactory information recording and/or reproduction.

What is claimed is:

1. An optical head for use in a magneto-optical recording/reproducing apparatus, comprising:

a light source unit for generating a linearly polarized light beam;

two beam generating means comprising a combination of a halfwave plate and a prism including a monoaxial crystal in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto a magnetooptical recording medium so as to form two light spots on the recording medium;

optical means for condensing the light beams from the recording medium; and detection means for detecting the light beams condensed by said optical means, wherein a ratio light intensity of the two light beams is controlled on the basis of an amount of rotation of said halfwave plate.

2. An optical head according to claim 1, wherein said light source unit is a semiconductor laser.

3. An optical head according to claim 1, wherein the polarized direction of the light beam emitted from said light source unit is so positioned as not to form an angle with respect to the longitudinal direction or perpendicular direction of information tracks of the recording medium.

4. An optical head according to claim 1, wherein the polarized direction of the light beam emitted from said light source unit coincides with the direction of the crystal axis of said monoaxial crystal.

5. An optical recording/reproducing apparatus, comprising:

a light source unit for generating a linearly polarized light beam;

two beam generating means comprising a combination of a halfwave plate and a prism including a monoaxial crystal, in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto an optical recording medium so as to form two light spots on the recording medium;

light beam cross section shaping means positioned between said two beam generating means and said converging means;

optical means for condensing the light beams from the recording medium; and detecting means for detecting the light beams condensed by said optical means, wherein a ratio of light intensity of the two light beams is controlled on the basis of an amount of rotation of said halfwave plate.

6. An optical head for use in a magneto-optical recording/reproducing apparatus, comprising:

a light source unit for generating a linearly polarized light beam;

two beam generating means comprising a combination of a halfwave plate and a prism including a monoaxial crystal, in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto a magnetooptical recording medium so as to form two light spots on the recording medium;

light beam cross section shaping means positioned between said two beam generating means and said converging means;

optical means for condensing the light beams from the recording medium; and detection means for detecting the light beams condensed by said optical means, wherein a ratio of light intensity of the two light beams is controlled on the basis of an amount of rotation of said halfwave plate.

7. An optical head comprising:

a light source unit for generating a linearly polarized light beam;

two beam generating means comprising a combination of a halfwave plate and a prism including a monoaxial crystal, in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto an optical recording medium so as to form two light spots on the recording medium; and light beam cross section shaping means positioned between said two beam generating means and said converging means, wherein a ratio of light intensity of the two light beams is controlled on the basis of an amount of rotation of said halfwave plate.

8. An optical head for use in a magneto-optical recording/reproducing apparatus, comprising:

a light source unit for generating a linearly polarized light beam;

two beam generating means comprising a combination of a halfwave plate and a prism including a monoaxial crystal in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto a magnetooptical recording medium so as to form two light spots on the recording medium;

application means for applying a predetermined magnetic field to the recording medium;

optical means for condensing the light beams from the recording medium; and detection means for detecting the light beams condensed by said optical means, wherein a ratio of light intensity of the two light beams is controlled on the basis of an amount of rotation of said halfwave plate.

9. An optical head according to claim 8, wherein said light source unit is a semiconductor laser.

10. An optical head according to claim 8, wherein the polarized direction of the light beam emitted from said light source unit is so positioned as not to form an angle with respect to the longitudinal direction or perpendicular direction of information tracks of said recording medium.

11. An optical head according to claim 8, wherein the polarized direction of the light beam emitted from said light source unit coincides with the direction of the crystal axis of said monoaxial crystal.

12. An optical head comprising:

a light source unit for generating a linearly polarized light beam;

two beam generating means comprising a combination of a halfwave plate and a prism including a monoaxial crystal in which said halfwave plate is positioned between said prism and said light source unit, said generating means generating two light beams from the light beam generated from said light source unit, the polarization directions of the generated two beams being orthogonal to each other; and converging means for converging the two light beams generated by said two beam generating means onto an optical recording medium so as to form two light spots on the recording medium, wherein a ratio of light intensity of the two light beams is controlled on the basis of an amount of rotation of said halfwave plate.

13. An optical head according to claim 12, wherein the polarized direction of the light beam emitted from said light source unit is so positioned as not to form an angle with respect to the longitudinal direction or perpendicular direction of information tracks of the recording medium.

14. An optical head according to claim 12, wherein said light source unit is a semiconductor laser.

15. An optical head according to claim 12, wherein said halfwave plate comprises a polarized direction rotating element for rotating the polarized direction of the light beam emitted from said light source unit.

16. An optical head according to claim 12, wherein the polarized direction of the light beam emitted from said light source unit coincides with the direction of a crystal axis of said monoaxial crystal.

17. An optical recording/reproducing apparatus comprising:

a light source unit for generating a linearly polarized light beam;

two beam generating means comprising a combination of a halfwave plate and a prism including a monoaxial crystal in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto an optical recording medium so as to form two light spots on the recording medium;

optical means for condensing the light beams from the recording medium; and detecting means for detecting the light beams condensed by said optical means, wherein a ratio of light intensity of the two light beams is controlled on the basis of an amount of rotation of said halfwave plate.

18. An optical recording/reproducing according to claim 17, wherein the polarized direction of the light beam emitted from said light source unit coincides with the direction of a crystal axis of said monoaxial crystal.

19. An optical recording/reproducing apparatus according to claim 17, wherein the polarized direction of the light beam emitted from said light source unit is so positioned as not to form an angle with respect to the longitudinal direction or perpendicular direction of information tracks of said recording medium.

20. An optical recording/reproducing apparatus according to claim 17, wherein said light source unit is a semiconductor laser.

21. An optical recording/reproducing apparatus according to claim 17, wherein said halfwave plate comprises a polarized direction rotating element for rotating the polarized direction of the light beam emitted from said light source unit.

22. A magneto-optical recording/reproducing apparatus comprising:

a light source unit for generating a linearly polarized light beam;

two beam generating means comprising a combination of a halfwave plate and a prism including a monoaxial crystal in which said halfwave plate is positioned between said prism and said light source unit, said generating means generating two light beams from the light beam generated from said light source unit, the polarization directions of the generated two beams being orthogonal to each other;

converging means for converging the two light beams generated by said two beam generating means onto a magnetooptical recording medium so as to form two light spots on the recording medium;

application means for applying a predetermined magnetic field to the recording medium;

optical means for condensing the light beams from the recording medium; and detecting means for detecting the light beams condensed by said optical means, wherein a ratio of light intensity of the two light beams is controlled on the basis of an amount of rotation of said halfwave plate.

23. A magneto-optical recording/reproducing apparatus according to claim 22, wherein said halfwave plate comprises a polarized direction rotating element for rotating the polarized direction of the light beam emitted from said light source unit.

24. A magneto-optical recording/reproducing apparatus according to claim 22, wherein the polarized direction of the light beam emitted from said light source unit coincides with the direction of a crystal axis of said monoaxial crystal.

25. A magneto-optical recording/reproducing apparatus according to claim 22, wherein the polarized direction of the light beam emitted from said light source unit is so positioned as not to form an angle with respect to the longitudinal direction or perpendicular direction of information tracks of the recording medium.

26. A magneto-optical recording/reproducing apparatus according to claim 22, wherein said light source unit is a semiconductor laser.

* * * * *

UNITED STATES PATENT AND TRADEMARK OFFICE
CERTIFICATE OF CORRECTION

PATENT NO. : 5,528,576  Page 1 of 3
DATED : June 18, 1996
INVENTOR(S) : Kohichiro NISHIKAWA It is certified that error appears in the above-indentified patent and that said Letters Patent is hereby corrected as shown below:

ON THE COVER PAGE:

In the title, item [54]: and col. 1, line 2,

"MONAXIAL" should read --MONOAXIAL--.

COLUMN 1:

Line 2, "MONAXIAL" should read --MONOAXIAL--;
Line 16, "record/" should read --recording/--;
Line 19, "record/reproducing" should read --recording/reproducing--; and
Line 24, "S-direction" should read --the S-direction--.

COLUMN 2:

Line 44, "such" should read --such a--.

COLUMN 3:

Line 3, "record/repro-" should read --recording/repro- --;

UNITED STATES PATENT AND TRADEMARK OFFICE
CERTIFICATE OF CORRECTION

PATENT NO. : 5,528,576
DATED : June 18, 1996
INVENTOR(S) : Kohichiro NISHIKAWA

It is certified that error appears in the above-indentified patent and that said Letters Patent is hereby corrected as shown below:

Line 13, "record/repro-" should read --recording/repro- --;
Line 42, "coincide" should read --coincide with--; and
Line 52, "record/reproducing" should read --recording/reproducing--; and
Line 60, "record/reproducing" should read --recording/reproducing--.

COLUMN 4:

Line 2, "record/reproducing" should read --recording/reproducing--;
Line 5, "record/reproducing" should read --recording/reproducing--; and
Line 17, "record/reproducing" should read --recording/reproducing--.

COLUMN 5:

Line 9, "p-direction" should read --P-direction--; and
Line 12, "record/reproducing" should read --recording/reproducing--.

UNITED STATES PATENT AND TRADEMARK OFFICE
CERTIFICATE OF CORRECTION

PATENT NO. : 5,528,576
DATED : June 18, 1996
INVENTOR(S) : Kohichiro NISHIKAWA

It is certified that error appears in the above-indentified patent and that said Letters Patent is hereby corrected as shown below:

<u>COLUMN 6</u>:

Line 3, "record/reproducing" should read --recording/reproducing--;
Line 26, "record/" should read --recording/--;
Line 48, "record/reproduc-" should read --recording/reproduc- --; and
Line 53, "record/" should read --recording/--.

<u>COLUMN 7</u>:

Line 13, "record/repro-" should read --recording/repro- --; and
Line 56, "ratio" should read --ratio of--.

Signed and Sealed this

Nineteenth Day of November, 1996

Attest:

BRUCE LEHMAN

*Attesting Officer*   *Commissioner of Patents and Trademarks*